(12) United States Patent
Ramirez, Jr. et al.

(10) Patent No.: US 8,201,478 B2
(45) Date of Patent: Jun. 19, 2012

(54) GEAR BOX FOR ICE DISPENSER

(75) Inventors: Emilio A. Ramirez, Jr., Roselle, IL (US); Ralph A. Bley, McHenry, IL (US)

(73) Assignee: Molon Motor and Coil Corp., Arlington Heights, IL (US)

( * ) Notice: Subject to any disclaimer, the term of this patent is extended or adjusted under 35 U.S.C. 154(b) by 86 days.

(21) Appl. No.: 12/387,222

(22) Filed: Apr. 29, 2009

(65) Prior Publication Data

US 2011/0239798 A1  Oct. 6, 2011

(51) Int. Cl.
*F16H 1/12* (2006.01)
*F16H 61/00* (2006.01)

(52) U.S. Cl. .......................... 74/606 R; 74/416

(58) Field of Classification Search ............. 74/89.14, 74/416, 421 A, 425, 606 R; 310/71, 75 R, 310/83, 89; H02K 5/00, 5/12, 7/10
See application file for complete search history.

(56) References Cited

U.S. PATENT DOCUMENTS

| | | |
|---|---|---|
| 3,980,937 A | 9/1976 | Bostrom et al. |
| 4,734,077 A | 3/1988 | Taylor et al. |
| 4,795,867 A | 1/1989 | Ohi et al. |
| 4,864,322 A | 9/1989 | Yamamoto et al. |
| 4,877,926 A | 10/1989 | Yamase |
| 5,062,312 A | 11/1991 | Watanuki et al. |
| 5,737,968 A | 4/1998 | Hardey et al. |
| 5,791,514 A | 8/1998 | Kirk, III et al. |
| 5,875,681 A | 3/1999 | Gerrand et al. |
| 5,937,507 A * | 8/1999 | Asakura et al. ............... 29/596 |
| 6,054,785 A | 4/2000 | Kerdjoudj et al. |
| 6,118,553 A | 9/2000 | Berg |
| 6,465,915 B1 | 10/2002 | Kerdjoudj et al. |
| 6,509,661 B1 * | 1/2003 | Kujira et al. .................... 310/89 |
| 6,617,726 B1 | 9/2003 | Tsergas |
| 6,998,744 B2 | 2/2006 | Tsergas |
| 2003/0011330 A1 * | 1/2003 | Machalek et al. ............. 318/15 |

(Continued)

FOREIGN PATENT DOCUMENTS

EP  0551113  7/1993

(Continued)

OTHER PUBLICATIONS

"Electric Motors Reference Issue," Machine Design, Apr. 9, 1970, pp. 45-49, vol. 42, No. 9, Benjamin L. Hummel, Cleveland, Ohio.

*Primary Examiner* — Richard W Ridley
*Assistant Examiner* — Phillip A Johnson
(74) *Attorney, Agent, or Firm* — Bishop & Diehl, Ltd.

(57) ABSTRACT

A gear box has a housing and a direct current motor inside of the housing. A rotatable output shaft extends through a wall of the housing and is rotatably driven by the motor via a gear train. The gear box can be used to dispense ice from a refrigerator/freezer. The motor drives the output shaft in one direction to dispense ice cubes. The motor also drives the output shaft in an opposite direction to crush ice and dispense the crushed ice. The gear box has a low-profile height. The gear train is located in front of a motor shaft of the motor and has a maximum height which does not exceed a maximum height of the motor. The motor shaft is perpendicular to the input gear of the gear train and to the output shaft of the gear box.

13 Claims, 5 Drawing Sheets

U.S. PATENT DOCUMENTS

| | | | |
|---|---|---|---|
| 2007/0018517 A1* | 1/2007 | Huck et al. | 310/71 |
| 2009/0121568 A1* | 5/2009 | Acosta et al. | 310/77 |

FOREIGN PATENT DOCUMENTS

| | | |
|---|---|---|
| EP | 0681359 | 11/1995 |
| EP | 1101919 | 11/1999 |
| GB | 1433250 | 4/1976 |
| JP | 56065765 | 6/1981 |
| JP | 02190586 | 7/1990 |
| JP | 03016841 | 1/1991 |
| JP | 05086761 | 4/1993 |
| JP | 05252692 | 9/1993 |
| JP | 08193668 | 7/1996 |
| JP | 08216659 | 8/1996 |
| JP | 09310946 | 12/1997 |
| JP | 10248212 | 9/1998 |
| WO | 95/31657 | 11/1995 |
| WO | 99/18318 | 4/1999 |

* cited by examiner

GEAR BOX FOR ICE DISPENSER

BACKGROUND OF THE INVENTION

This invention relates to gear boxes, more particularly, to compact gear boxes with motors driving output shafts. In embodiments of the invention, a compact gear box has a DC motor which drives a gear train which drives an output shaft. The gear box can be used to dispense ice, such as ice cubes and crushed ice, from refrigerators/freezers or related products. The gear boxes can be used for other applications as well. In embodiments of the present invention, the gear box has a low-profile height. The present invention also pertains to related methods, including methods of making gear boxes, methods of operating gear boxes, and methods of dispensing ice.

U.S. Pat. No. 6,054,785 to Kerdjoudj et al. issued on Apr. 25, 2000 and was assigned to the same assignee as the present invention. Kerdjoudj et al., upon which the present invention is an improvement, has a compact miniature gear motor box that includes a direct current motor, a worm gear, a pinion transfer gear, at least one cluster gear, an output gear and an output shaft. In Kerdjoudj et al., the gear train begins at the motor shaft and extends backward toward the motor along a side of the motor. The motor and the gear train are stacked upon each other. The arrangement of the gear train and the motor results in the gear box having a relatively large height. Accordingly, the Kerdjoudj et al. device can be improved.

It would be an improvement to provide a compact gear box that has a low-profile height. Another improvement would be to provide a gear box for an ice maker of a refrigerator/freezer in which the gear box has a low-profile.

Accordingly, needs exist to improve gear boxes, such as gear boxes for refrigerator/freezer ice dispensers, for the reasons mentioned above and for other reasons.

SUMMARY OF THE INVENTION

The present invention provides new gear boxes having a motor which drives a gear train which drives an output shaft. The present invention is described in an embodiment of a gear box for use in a refrigerator/freezer to dispense ice, for example ice cubes and crushed ice. However, the present invention is broader than gear boxes for ice dispensers and is not limited to gear boxes for ice dispensers.

The present invention can provide a compact gear box having a motor, a gear train and an output shaft. The motor and the gear train are contained inside of a housing and the motor drives the output shaft via the gear train. The output shaft extends through a wall of the housing and can be engaged with an ice dispenser of a refrigerator/freezer. The motor, gear train and output shaft are reversible so that the output shaft performs a first function when rotated in one direction and performs a second function when rotated in an opposite direction. For example, when the output shaft is rotated in one direction the ice dispenser can dispense ice cubes and when the output shaft is rotated in an opposite direct, the ice dispenser can crush ice and dispense the crushed ice. The structure of the motor and the gear train also allows for the gear box, including the housing, to have a low-profile or low height.

In an embodiment of the present invention, a gear box has a housing. A direct current motor is inside of the housing and has a motor shaft. A gear train is inside of the housing and is driven by the motor shaft. The gear train is located entirely on a side of the motor having the motor shaft. A rotatable output shaft extends through a wall of the housing and is rotatably driven by the gear train. A circuit board is inside of the housing and is electrically connected to the motor.

The motor shaft may be generally perpendicular to the output shaft.

The gear train may have a first cluster gear having outer teeth engaged with a gear attached to the motor shaft, a second cluster gear having outer teeth engaged with inner teeth of the first cluster gear, a third cluster gear having outer teeth engaged with inner teeth of the second cluster gear, and an output gear having teeth engaged with inner teeth of the third cluster gear. The output gear is engaged with the output shaft. The motor shaft may be generally perpendicular to an axis of the first cluster gear.

The gear train may have a maximum height which does not exceed a maximum height of the motor.

The housing may have a base having a generally planer bottom wall. The motor is supported by the base and has a maximum height above the base. The gear train is supported by the base and has a maximum height above the base that does not exceed the maximum height of the motor.

The housing may have a first housing portion containing the motor and a second housing portion containing the gear train. A maximum height of the second housing portion does not exceed a maximum height of the first housing portion. The second housing portion may be offset lower from the first housing portion. The circuit board may be contained within the first housing portion.

In an embodiment of the present invention, a gear box for driving an ice dispenser has a housing having a first housing portion and a second housing portion. The second housing portion has a height which does not exceed a height of the first housing portion. A direct current motor is inside of the first housing portion, and the motor has a motor shaft extending into the second housing portion. A gear train is contained inside of the second housing portion and is located entirely on a side of the motor having the motor shaft. An output shaft extends through a wall of the second housing portion and is driven by the motor via the gear train.

The housing may have a base in which the second housing portion has a height above the base which does not exceed a height of the first housing portion above the base.

A top of the second housing portion may be offset lower from a top of the first housing portion.

An axis of the motor shaft may be generally perpendicular to an axis of the output shaft.

A circuit board may be contained within the first housing portion and electrically connected to the motor.

Embodiments of the present invention may have various features and provide various advantages. Any of the features and advantages of the present invention may be desired, but, are not necessarily required to practice the present invention.

DETAILED DESCRIPTION OF THE INVENTION

Figure 1:
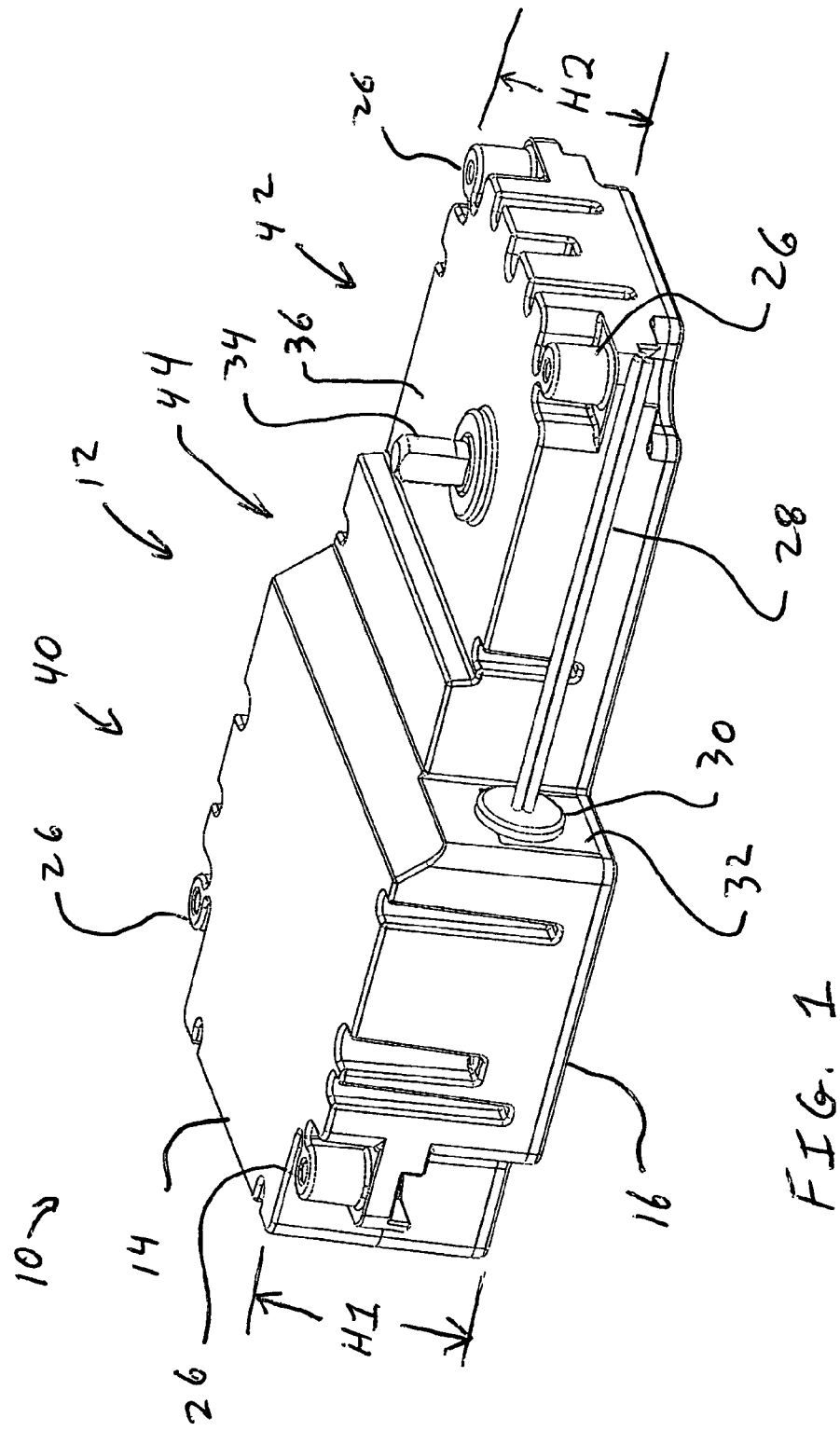
FIG. 1 is an exterior perspective view of a gear box for an ice dispenser according to the present invention.
Figure 2:
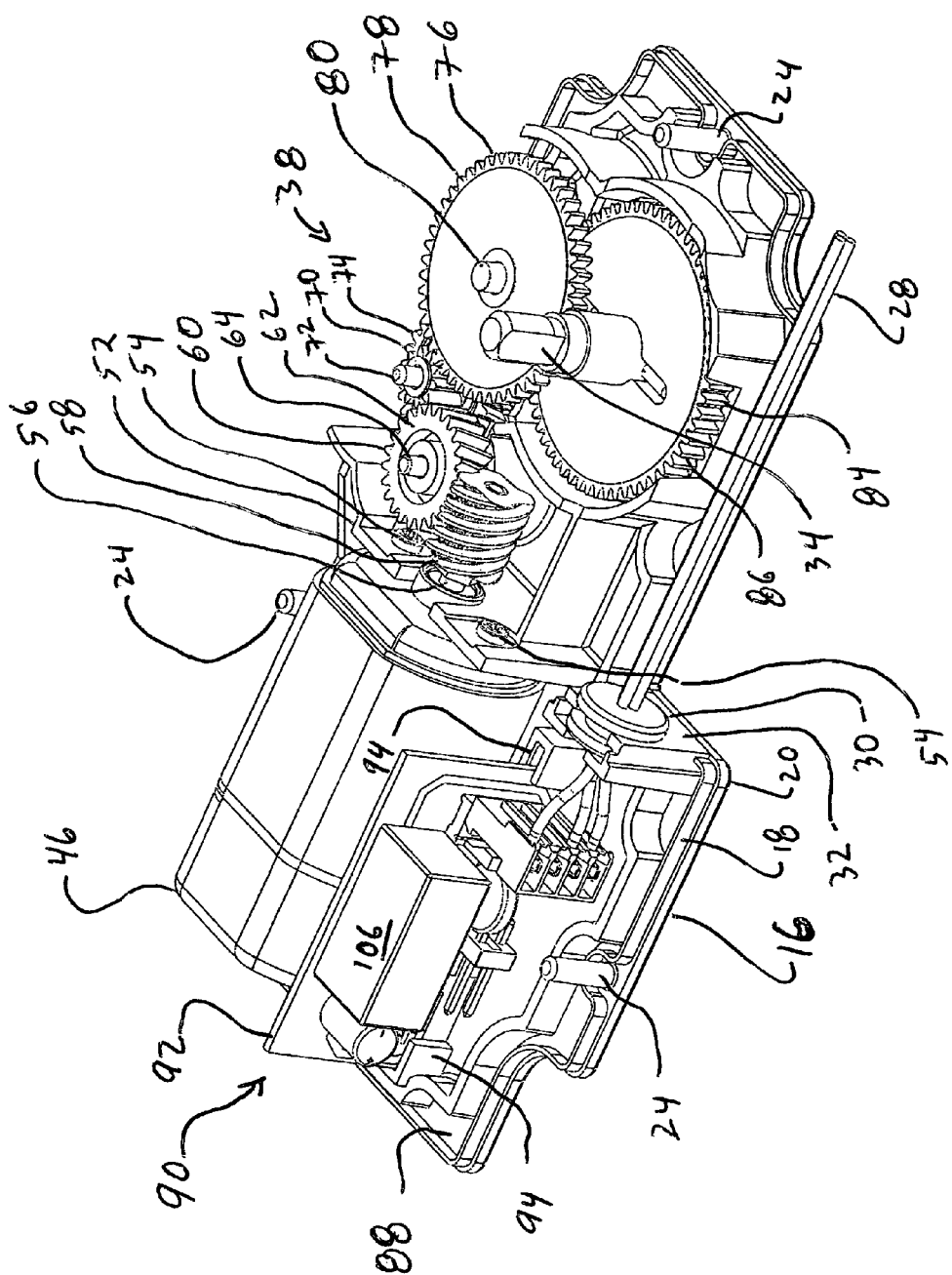
FIG. 2 is an interior perspective view of the gear box with a cover removed.
Figure 3:
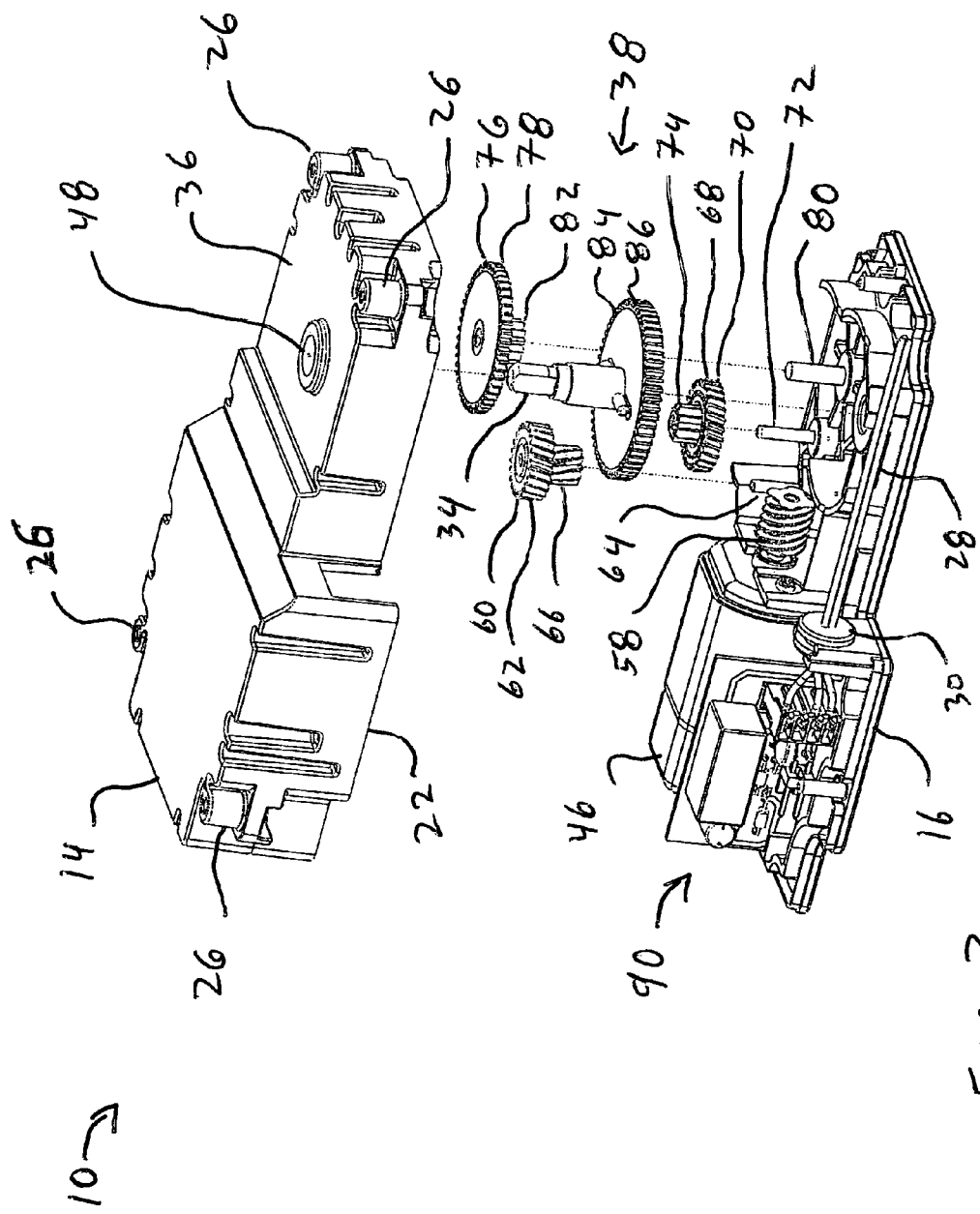
FIG. 3 is a partially exploded perspective view of the gear box.
Figure 4:
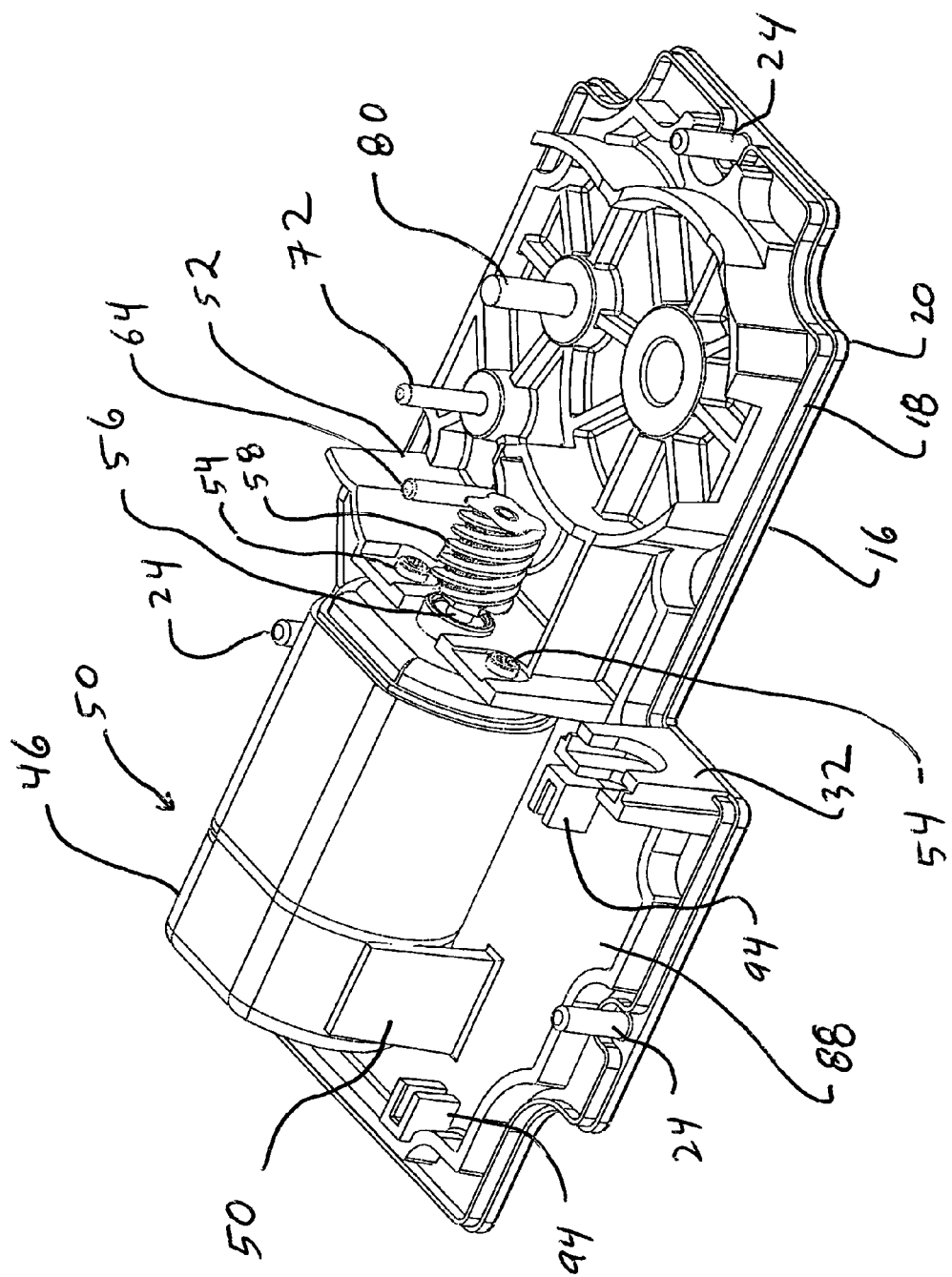
FIG. 4 is another interior perspective view of the gear box with various components removed.

One example of a gear box 10 according to the present invention is shown in FIGS. 1-5. The gear box 10 can be used to drive an ice dispenser for an ice maker of a refrigerator/freezer (not shown). FIG. 1 shows a perspective, exterior view of the gear box 10. The gear box 10 has a closed housing 12 having a cover 14 and a base 16. The cover 14 and the base 16 are made of plastic material; however, any suitable material can be used, for example, metal materials. The cover 14 and the base 16 are attached together by ultrasonic welding. Referring to FIGS. 2 and 4, the base 16 has an upward protruding lip 18 recessed inward from an outer edge 20 of the base 16 and extending along the outer perimeter of the base 16. The lip 18 of the base 16 provides a recessed area which receives a lower edge 22 (FIG. 3) of the cover 14. The cover 14 and the base 16 are ultrasonically welded together where the cover 14 and the base 16 contact each other in the recessed area. Preferably, the cover 14 and the base 16 are sealed together to prevent liquids, such as water, and humidity from entering into the gear box 10. Although a fluid seal may not necessarily be required to practice the present invention. Fluid seals other than or in addition to ultrasonic welding can also be used to prevent fluid from entering inside of the gear box 10. The cover 14 and the base 16 can be secured together by any other alternative suitable means, for example, adhesives, screws, fasteners, and snap-fit structures, etc. Also, the cover 14 and the base 16 can be permanently or removably secured together. The base 16 has upward protruding locating bosses 24 which cooperate with corresponding structure on the cover 14 for easy proper alignment of the cover 14 on the base 16.

The gear box 10 has mounting locations 26 for mounting the gear box 10, for example, inside of an ice-making compartment of the refrigerator/freezer. The mounting locations 26 shown in FIG. 1 are bosses having through-holes. However, the mounting locations 26 can have any suitable structure for mounting the gear box 10.

Referring to FIG. 1, electrical lead wires 28 extend through a rubber grommet 30 through a wall 32 of the cover 14 of the housing 12. The lead wires 28 are electrically connected to the electrical components inside of the gear box 10 (FIGS. 2 and 3). The lead wires 28 are electrically connected to an electrical power source (not shown) which provides electric power, such as direct current, through the electrical connection to the electrical components inside of the gear box 10. For example, the lead wires 28 can be connected to a control circuit of an ice dispenser of the refrigerator/freezer. The rubber grommet 30 maintains a fluid seal against the wall 32 of the cover 14 and also against the lead wires 28.

Referring to FIG. 1, the gear box 10 has a rotatable output shaft 34 which extends through a wall 36 of the housing 12 and provides rotational driving forces. During use of the gear box 10, the output shaft 34 is engaged with a mating structure, such as a rotating shaft, of an ice dispenser mechanism (not shown) to drive/operate the ice dispenser to dispense ice. The output shaft 34 is shown as a round shaft having opposite flat side portions for quick coupling to the corresponding shafts of the refrigerator/freezer ice dispenser mechanism, and for effectively transmitting torque to the refrigerator/freezer ice dispenser shafts. Other output shaft designs or output mechanisms could be used for the output shaft 34 of the gear box 10. Round shafts, D-shaped shafts, hex shafts, and female shafts are a few examples of suitable alternatives for the output shaft 34. The output shaft 34 is driven at desired speeds, torques and rotational directions (clockwise and/or counter-clockwise) by a gear train 38 (FIG. 2) inside of the gear box 10.

Still referring to FIG. 1, the gear box 10 has a low-profile height. The structure and arrangement of the internal components of the gear box 10 allows the gear box 10 to have a small height. The low-profile height of the gear box 10 significantly reduces the size of the gear box 10 relative to existing gear boxes for ice dispensers. The low-profile height of the gear box 10 allows the gear box 10 to be located at a small space inside of the refrigerator/freezer ice dispensing area. Because the gear box 10 requires less space inside of the refrigerator/freezer there is greater amount of space available for other refrigerator/freezer components. For example, the ice bucket inside of the freezer can be larger and contain more ice because the gear box 10 is smaller. Referring to FIGS. 1 and 3, the housing 12 of the gear box 10 has a first housing portion 40 with a height H1 connected to a second housing portion 42 having a height H2. The height H2 of the second housing portion 42 is smaller than the height H1 of the first housing portion 40. Accordingly, there is a step-down or off-set 44 in height from the first housing portion 40 to the second housing portion 42. In an embodiment, the height H1 of the first housing portion 40 is about 1.5" and the height H2 of the second housing portion 42 is about 0.975". As can be seen in FIG. 3, the first housing portion 40 contains a motor 46 and the second housing portion 42 contains the gear train 38. The output shaft 34 extends upward through a hole 48 in the top wall 36 of the second housing portion 42. See also, FIG. 1.

The components of the gear box 10 inside of the housing 12 will now be described with reference to FIGS. 2-4. FIG. 2 shows a perspective view of the inside of the gear box 10 with the cover 14 removed, FIG. 3 shows a partially exploded, perspective view of the gear box 10, and FIG. 4 shows a perspective view of the gear box 10 with various components removed. The gear box 10 has the motor 46 positioned in a motor holding receptacle 50 of the base 16. A partition wall 52 separates a first portion of the base 16 having the motor holding receptacle 50 from a second portion of the base 16 having the gear train 38. Screws 54 through the partition wall 52 can be used to securely hold the motor 46 in place. The first portion of the base 16 is part of the first housing portion 40 of the housing 12 and the second portion of the base 16 is part of the second housing portion 42 of the housing 12.

The motor 46 is a direct current (DC) motor which is capable of rotating its motor shaft 56 in both clockwise and counter-clockwise directions. The motor shaft 56 is connected to and drives a worm gear (first gear) 58. The motor 46 and worm gear 58 drive the gear train 38. More specifically, the worm gear 58 is engaged with outer teeth 60 of a of a cluster gear (second gear or input gear) 62 which rotates about a gear pin 64. Inner teeth 66 of the cluster gear 62 are engaged with outer teeth 68 of a cluster gear (third gear) 70 which rotates about a gear pin 72. Inner teeth 74 of the cluster gear 70 are engaged with outer teeth 76 of a cluster gear (fourth gear) 78 which rotates about a gear pin 80. The inner teeth 82 of the cluster gear 78 are engaged with teeth 84 of an output gear (fifth gear) 86. The output shaft 34 is carried by the output gear 86 and rotates along with the output gear 86.

The gear train 38 driven by the motor 46 is designed to provide low rotational speed and high torque to the output shaft 34. The low speed, high torque rotation of the output shaft 34 can be beneficial for driving an ice dispenser to crush ice and dispense the crushed ice or to dispense ice cubes. The motor 46 is operated in two directions, clockwise and counter-clockwise. One direction of the motor 46, such as a counter-clockwise direction, operates the output shaft 34 in one direction to provide the function of dispensing ice cubes, for example. The other opposite direction of the motor 46, such as clockwise, operates the output shaft 34 in its opposite direction to provide the function of crushing ice and dispensing the crushed ice, for example.

Referring to FIGS. 2 and 3, one feature of the gear box 10 is that the motor shaft 56 of the motor 46 has an axis which is generally perpendicular (about 90°) to an axis of the cluster gear 62 (generally perpendicular to the gear pin 64). Another feature of the gear box 10 is that the axis of the motor shaft 56 is generally perpendicular (about 90°) to an axis of the output shaft 34. Also, the gear pins 64, 72, 80 and the output shaft 34 have axes which are generally parallel. Accordingly, the axis of the motor shaft 56 is generally perpendicular (about 90°) to the axes of all of the gears 62, 70, 78, 86 in the gear train 38.

Another feature of the gear box 10 is that the entire gear train 38 is located in front of the motor 46 (on the side of the motor 46 having the motor shaft 56) without extending above the uppermost portion of the motor 46 or below the lowermost portion of the motor 46. Referring to FIG. 2, the motor 46 and the gear train 38 are both supported by the base 16 which has a planer bottom wall 88. In the illustrated embodiment of the present invention, the motor 46 has opposed flat sides. One flat side of the motor 46 rests against the bottom wall 88. The other, opposite flat wall of the motor 46 represents the uppermost portion of the motor 46, which can be the maximum height of the motor 46. In other words, the motor 46 has a maximum height which extends a certain distance above the bottom wall 88 of the base 16. It can be advantageous to use a motor 46 which has the opposed flat sides rather than a round or cylindrical motor. The flat-sided motor enhances the low-profile height of the gear box 10. The gear train 38 also extends upward above the base 16. The maximum height of the gear train 38 above the base 16 does not exceed the maximum height of the motor 46 above the base 16. This height relationship between the motor 46 and gear train 38 can also be understood by viewing FIG. 1 in which the height H2 of the second housing portion 42 containing the gear train 38 is lower than the height H1 of the first housing portion 40 containing the motor 46. The height of the output shaft 34 of the gear box 10 is not considered for the purposes of the height relationship between the motor 46 and the gear train 38. The structure of the motor 46 and the gear train 38 allow for the gear box 10 to have its low-profile height.

Referring to FIGS. 2 and 3, the gear box 10 has a printed circuit board (PCB) assembly 90. The PCB assembly 90 is contained within the first housing portion 40 of the gear box 10. The PCB assembly 90 is electrically connected to the lead wires 28 and to the motor 46 to permit electrical power to be supplied to the motor 46. The PCB assembly 90 has a circuit board 92 standing on an edge of the circuit board 92 and extending upward away from the base 16. Retainers 94 hold the circuit board 92 in place. The retainers 94 are also shown in FIG. 4. Referring to FIGS. 2 and 3, the height of the upstanding PCB assembly 90 does not extend beyond the maximum height of the motor 46. The low height of the upstanding PCB assembly 90 contributes to maintaining the low height of the first housing portion 40 (FIGS. 1 and 2).

Figure 5:
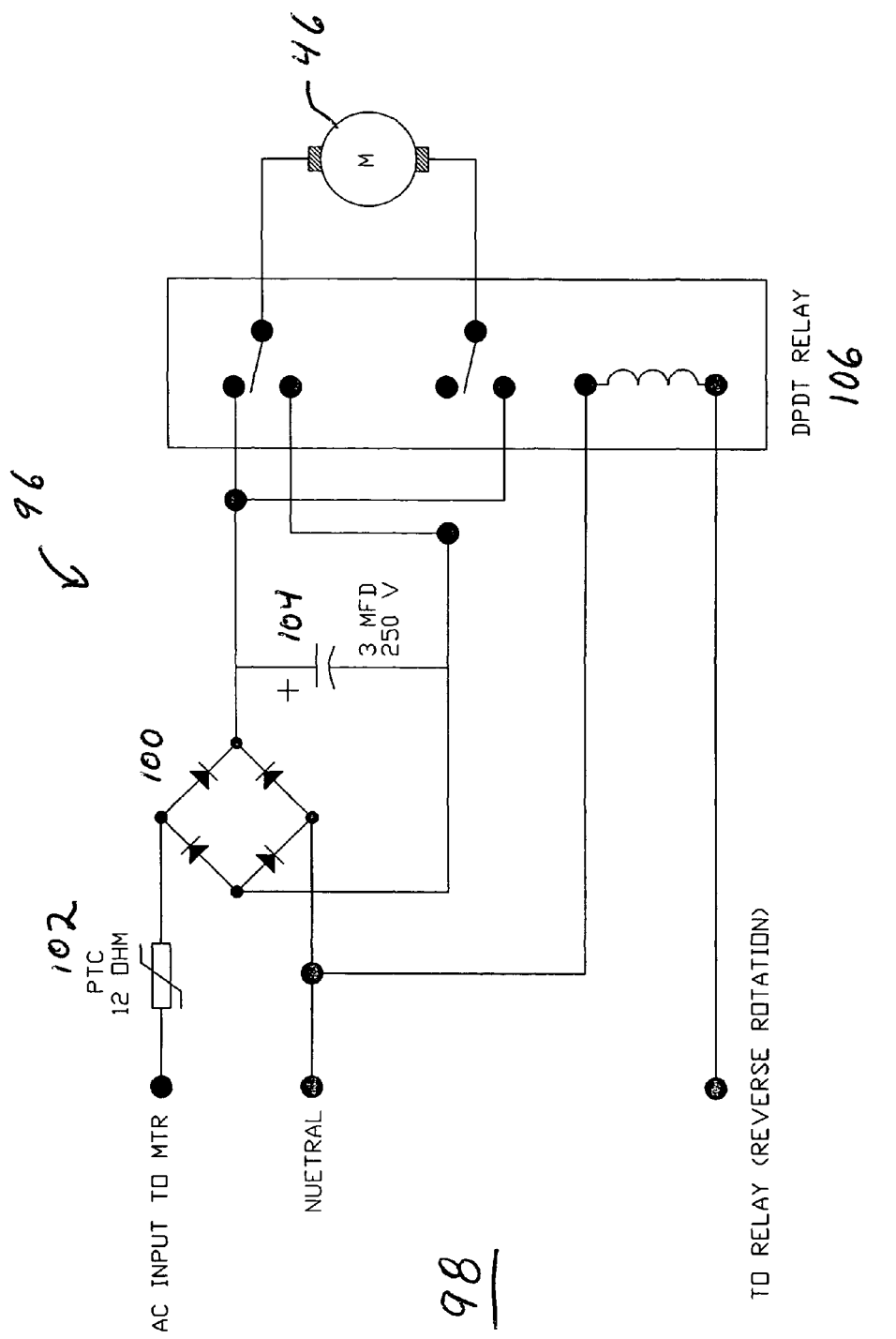
FIG. 5 is a schematic circuit diagram (circuit layout) of a printed circuit board of the gear box.

FIG. 5 shows a schematic diagram of an electrical circuit 96 for the gear box 10. An AC power source 98 is provided from the refrigerator/freezer to the PCB assembly 90. A bridge rectifier 100 converts the AC current to DC current to power the DC motor 46. The electrical circuit 96 of the circuit board 92 has a positive temperature coefficient (PTC) 102 which provides protection for the windings of the motor 46. A capacitor 104 is electrically connected to the circuit board 92 and provided in the electrical circuit for filtering, and thus, the capacitor 104 provides for smoother operation of the motor 46. The PCB assembly 90 has a relay (switch) 106, such as a DPDT relay, used to reverse the polarity of the DC current applied to the motor 46. The motor 46 can be operated in a first direction (counter-clockwise) to dispense ice cubes, for example. The relay 106 can change the operation of the motor 46 to a second, reverse direction (clockwise). The motor 46 operating in the second direction can be used to crush ice and dispense the crushed ice, for example. Accordingly, the relay 106 can reverse the motor operation for alternatively dispensing ice cubes and crushed ice.

The refrigerator/freezer (not shown) has an ice dispensing selector which allows an operator to select ice cubes or crushed ice. When ice cubes are selected by the operator, AC power 98 is supplied to the PCB assembly 90 which operates the relay 106 in a first mode. The relay 106 supplies the DC current (converted from the AC current) to the motor 46 to operate the motor 46 in a first direction. The motor 46 drives the gear train 38 which rotates the output shaft 34 in a first direction. The rotating output shaft 34 drives the ice dispenser to dispense ice cubes. When crushed ice is selected by the operator, AC power 98 is supplied to the PCB assembly 90 which operates the relay 106 in a second mode. The relay 106 supplies the DC current (converted from the AC current) to the motor 46 to operate the motor 46 in a second, reverse direction. The motor 46 drives the gear train 38 which rotates the output shaft 34 in a second, reverse direction. The reverse rotating output shaft 34 drives the ice dispenser to crush ice and dispense the crushed ice. In an embodiment of the present invention, the motor 46 operates with about the same rotational speed and torque in both the clockwise and counter-clockwise directions with no load or equal loads on the motor 46. There may be different loads placed on the motor 46 during use of the gear box 10 which would, of course, result in different operational rotational speeds and torques of the motor 46, for example during clockwise and counter-clockwise rotation.

The gear box 10 can be designed to operate at various desired electrical voltages. For example, the operation voltage for the gear box 10 may vary at either 50 Hz or 60 Hz from 12 to 48 volts of direct current (VDC) or from 120 to 220 volts of alternation current (VAC) rectified. The motor 46 is selected for its operational characteristics in conjunction with the operation voltage and the desired rotational speed and torque.

Operation of the gear train 38 will now be further described. When electrical power is supplied to the motor 46, the motor 46 rotates the motor shaft 56 which rotates the worm gear 58. The worm 58 is engaged with and rotates the cluster gear 62. The cluster gear 62 is engaged with and rotates the cluster gear 70. The cluster gear 70 is engaged with and rotates the cluster gear 78. The cluster gear 78 is engaged with and rotates the output gear 86 which rotates the output shaft 34. When the operation of the motor 46 is reversed, all of the gears 58, 62, 70, 78, 86 rotate in reverse directions as does the output shaft 34. The gear train 38 and gears 58, 62, 70, 78, 86 are designed to provide desired rotational outputs of the output shaft 34. The gear box 10 provides about the same rotational speed and torque of the output shaft 34 for clockwise and counter-clockwise rotation of the output shaft 34 when there is no load or about equal loads placed on the output shaft 34. There may be different loads placed on the output shaft 34, and thus, the gear train 38 and the motor 46, during use of the gear box 10. The different loads would, of course, result in different operational rotational speeds and torques of the output shaft 34, for example, during clockwise and counter-clockwise rotation of the output shaft 34. When the output shaft 34 drives the ice dispenser to dispense ice cubes there is a relatively lower load placed on the output shaft 34, gear train 38 and motor 46 compared to a relatively higher load when the output shaft 34 drives the ice dispenser to crush ice and dispense the crushed ice. The present invention can be practice using alternative gears and gear trains as desired.

Numerous modifications and variations of the present invention are possible in light of the above teachings. The present invention has been described in terms of a gear box for use in refrigerators/freezers for dispensing ice. However, the present invention is broader than that and can be used for other applications. Also, different gear trains or force transfer mechanisms can be used to drive the output shaft 34 by the motor 46. For example, instead of using the worm gear 58 as the drive gear from the motor 46, a bevel gear, a helical gear (preferably a 45° helix angle) or any other type of gear or combination of gears could be used. The other gears could also be changed as desired.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A compact gear box comprising:
a housing having at least one partition wall dividing the housing into portions;
a direct current motor inside of the housing and having a motor shaft;
a gear train inside of the housing and driven by the motor shaft, the gear train surrounded by the partition wall and located separately from and on a side of the motor, wherein the gear train has a maximum height which does not exceed a maximum height of the motor;
a rotatable output shaft extending through a wall of the housing and rotatably driven by the gear train; and
a circuit board inside of a first housing portion and electrically connected to the motor, wherein the motor, the gear train and the output shaft are reversible so that the output shaft performs a first function when rotated in one direction, and performs a second function when rotated in an opposite direction.

2. The gear box according to claim 1, wherein the motor shaft is generally perpendicular to the output shaft.

3. The gear box according to claim 1, wherein the gear train comprises:
a first cluster gear having outer teeth engaged with a gear attached to the motor shaft;
a second cluster gear having outer teeth engaged with inner teeth of the first cluster gear;
a third cluster gear having outer teeth engaged with inner teeth of the second cluster gear; and
an output gear having teeth engaged with inner teeth of the third cluster gear, the output gear engaged with the output shaft.

4. The gear box according to claim 3, wherein the motor shaft is generally perpendicular to an axis of the first cluster gear.

5. The gear box according to claim 1, wherein the housing has a base having a generally planer bottom wall,
wherein the motor is supported by the base and has a maximum height above the base; and
wherein the gear train is supported by the base and has a maximum height above the base that does not exceed the maximum height of the motor.

6. The gear box according to claim 1, wherein the housing comprises:
the first housing portion containing the motor; and
a second housing portion containing the gear train, the second housing portion separated from the first housing portion by a partition wall;
wherein a maximum height of the second housing portion does not exceed a maximum height of the first housing portion.

7. The gear box according to claim 6, wherein the second housing portion is offset lower from the first housing portion.

8. The gear box according to claim 6, wherein the circuit board is contained within the first housing portion.

9. A gear box for driving an ice dispenser, comprising:
a housing having a first housing portion and a second housing portion, the second housing portion separated from the first housing portion by at least one partition wall, the second housing portion having a height which does not exceed a height of the first housing portion;
a direct current motor inside of the first housing portion, the motor having a motor shaft extending into the second housing portion;
a gear train surrounded by the partition wall and contained inside of the second housing portion and located entirely on a side of the motor having the motor shaft; and
an output shaft extending through a wall of the second housing portion and driven by the motor via the gear train, wherein the output shaft performs a first function when rotated in one direction, and performs a second function when rotated in an opposite direction.

10. The gear box according to claim 9, wherein the housing has a base, the second housing portion having a height above the base which does not exceed a height of the first housing portion above the base.

11. The gear box according to claim 9, wherein a top of the second housing portion is offset lower from a top of the first housing portion.

12. The gear box according to claim 9, wherein an axis of the motor shaft is generally perpendicular to an axis of the output shaft.

13. The gear box according to claim 9, further comprising a circuit board contained within the first housing portion and electrically connected to the motor.

* * * * *